March 8, 1927.

A. H. STEBBINS 1,620,241

AIR VOLUME DUST REDUCER

Filed Oct. 3, 1925

INVENTOR
Albert H. Stebbins
BY
ATTORNEY

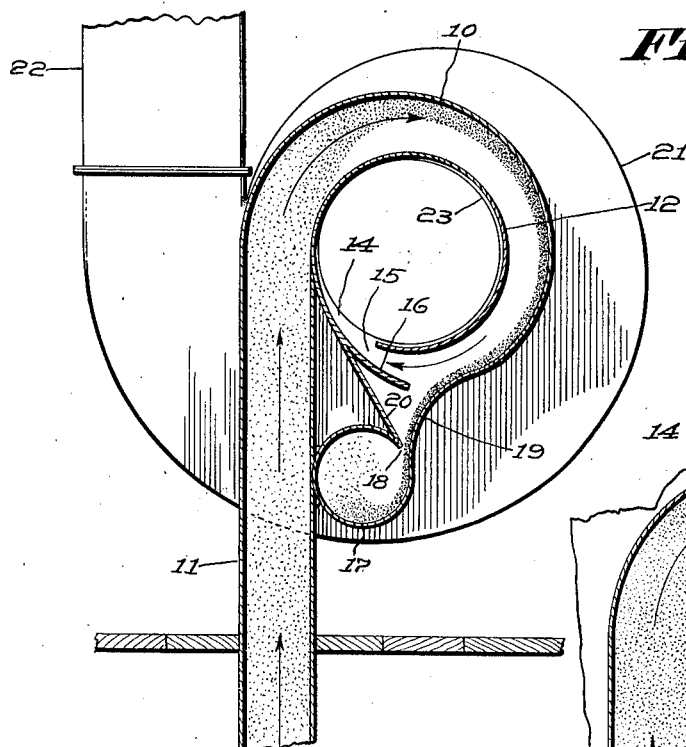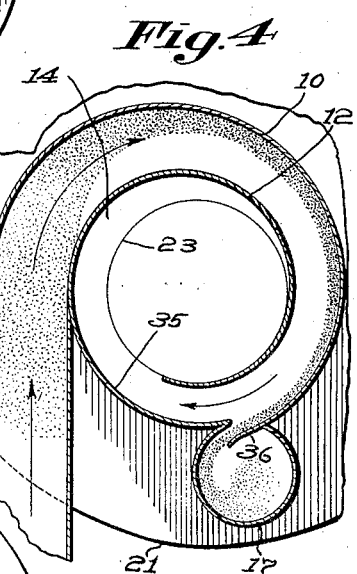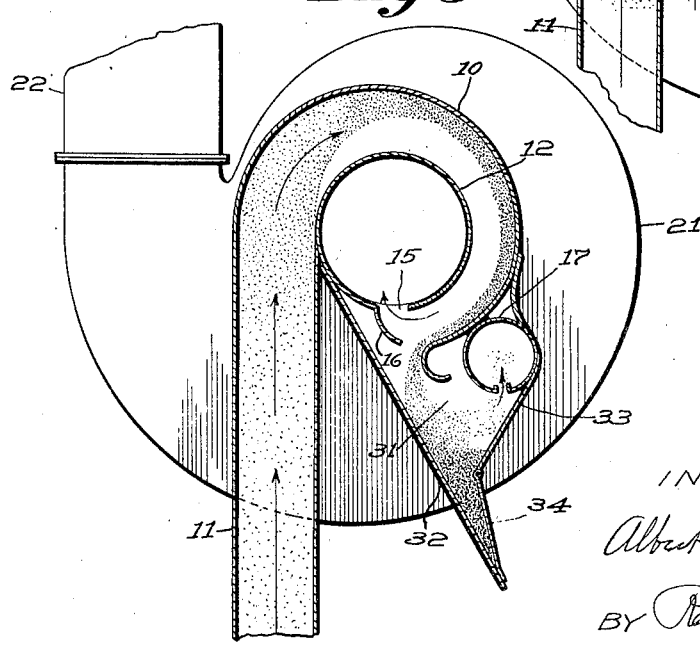

Patented Mar. 8, 1927.

1,620,241

UNITED STATES PATENT OFFICE.

ALBERT H. STEBBINS, OF LOS ANGELES, CALIFORNIA.

AIR-VOLUME DUST REDUCER.

Application filed October 3, 1925. Serial No. 60,209.

This invention relates to a device for reducing the volume of dust laden air and is adapted for use with dust collecting apparatus.

In various industries a large volume of air is used to collect a relatively small amount of dust, and it is desirable to reduce the air volume before any attempt is made to remove the dust from the air.

Thru the use of an air volume reducer such as contemplated by the present invention, a much smaller dust collector may be used to meet the requirements of a particular commercial unit than would prove satisfactory if no provision were made for reducing the volume of dust laden air to be treated. Furthermore, since, thru the use of the present device, the dust to be removed is crowded or concentrated into a relatively small volume of air, a dust collecting apparatus will remove the dust from the air much more completely than it would if the same amount of dust were suspended in a large volume of air.

In carrying out the present invention, the large volume of air in which the dust is suspended is directed into a receptacle of more or less cylindrical shape so that the air will travel rapidly in a circular path within the receptacle to cause the dust to be thrown outwardly by centrifugal force against the inner wall of the receptacle, while the air that moves inwardly toward the axis of the receptacle will be practically free from dust, and one pipe or conduit is provided for removing the dust-freed air from the central portion of the receptacle, while separate means is provided for receiving the dust laden air lying adjacent the inner wall of the receptacle.

The construction of the receptacle into which the dust laden air is delivered, and the means for removing the dust-freed air from the central portion of the receptacle and the separate means for removing the dust laden air from adjacent the wall of the receptacle may be varied extensively, but the primary feature of the present invention resides in the arrangement whereby the dust laden air is caused to whirl in the receptacle at high velocity to remove the dust from the central portion thereof, and in one means for removing the dust-freed air and a separate means for removing the dust laden air.

The various features of the invention and mechanism for carrying out the same will be hereinafter described in connection with the accompanying drawings which illustrate good practical forms thereof.

In the drawings:—

Fig. 2 is a transverse, vertical, sectional view of Fig. 1.

Fig. 3 is a sectional view, similar to Fig. 2, of a modified form of air volume reducer; and Fig. 4 is a sectional view similar to Fig. 2, but shows still a different modification.

Figure 1:
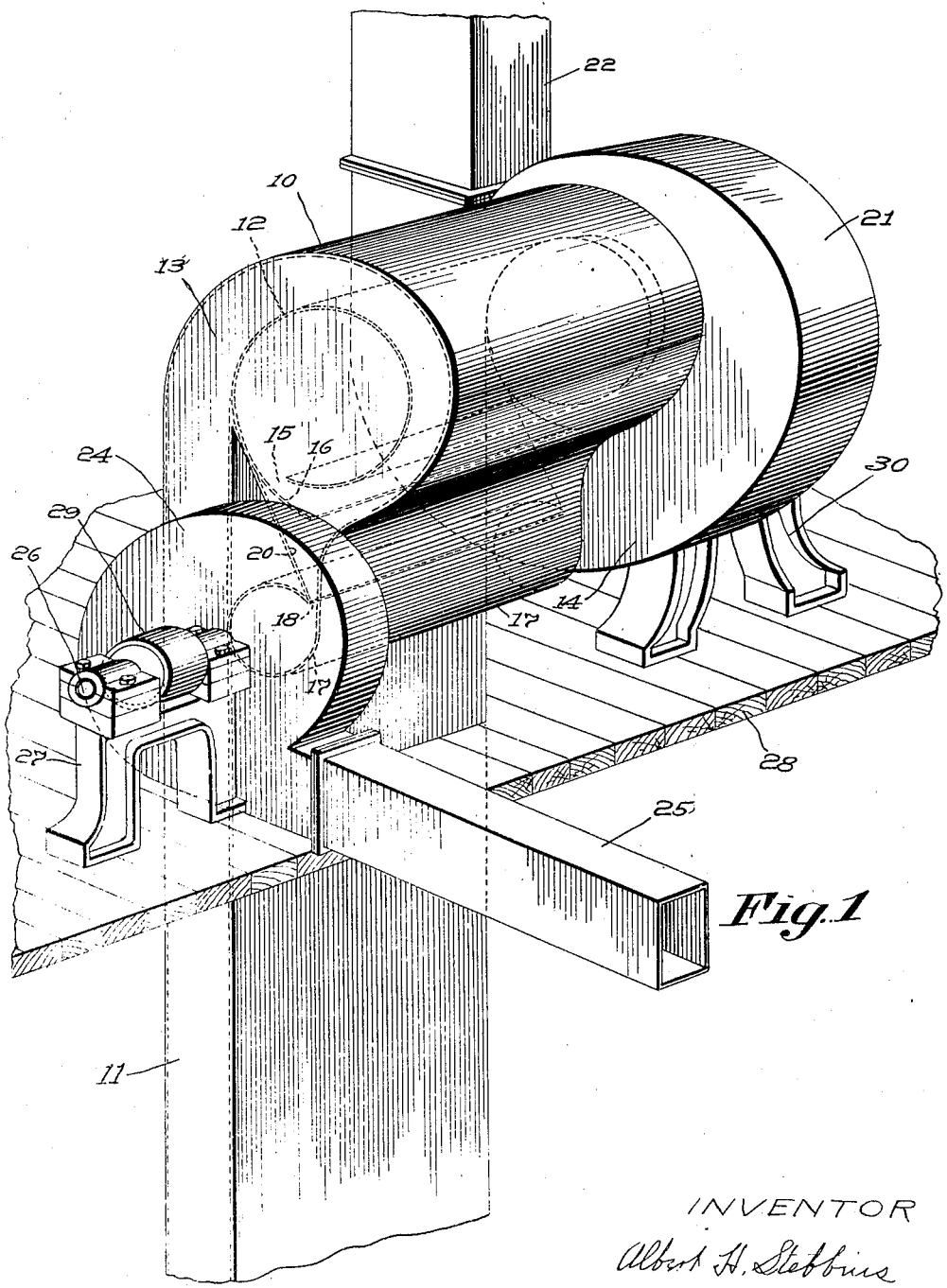
Fig. 1 is a perspective view of one form of air volume reducer constructed in accordance with the present invention.

The receptacle or casing into which the dust laden air is delivered for treatment may be variously constructed and its configuration in transverse section may form a circle, involute curve, avoidal curve, or may be given other configurations as may be desired.

In the construction shown in Figs. 1 and 2, the receptacle 10 is given substantially the form of an involute curve in cross section, and the dust laden air to be treated is delivered tangentially into the casing 10 by the wide conduit 11, the width of which preferably extends lengthwise of the casing 10 thruout the length of the latter, as clearly shown in Fig. 1, the arrangement being such that as the dust laden air is delivered into the receptacle 10, it will whirl in the receptacle at high speed so that the dust will be thrown outwardly by centrifugal force towards the inner wall of the receptacle, as will be apparent from Figs. 2, 3 and 4, wherein the dust is indicated by small dots.

The air within the receptacle 10 which moves inwardly towards the axis of the receptacle will be practically free from dust as the latter is thrown outwardly by centrifugal force, and, in accordance with the present invention, means is provided for removing this dust freed air from the central portion of the receptacle, and separate means is provided for removing the dust laden air traveling near the inner wall of the receptacle. In Figs. 1 and 2, the means shown for removing the dust freed air consists of a pipe 12 disposed centrally within the receptacle, and extending from one end wall 13 thereof thru the opposite end wall 14 of the receptacle, and the pipe 12 is provided with a slot or opening 15 thru which air may pass from the receptacle into the pipe. This opening may be variously formed, and as shown in Figs. 1 and 2 is provided with a curved downwardly extending lip 16 that serves to direct the whirling air into the tube 12. The dust laden air which is thrown outwardly by centrifugal force against the inner wall of the receptacle 10 is directed into a pipe 17 which extends lengthwise of the receptacle between the opposite walls thereof, and this pipe 17 has an inlet opening or slot 18 and the dust laden air is directed into the pipe thru this slot by a curved wall 19 of the receptacle. A second wall 20 extending downwardly from the central pipe 12 towards the pipe 17 helps to direct the dust laden air into the latter pipe.

In the construction shown, a relatively large suction fan 21 is connected to the right hand end of the central pipe 12 and serves to draw the dust-freed air within the receptacle 10 into the pipe 12 so that it will be drawn thru this pipe and will then pass thru the fan casing and will be discharged thru the discharge conduit 22. The wall 14 above mentioned may constitute one side wall of the fan casing 21, as shown, and a central hole 23 is formed in this wall for the passage of air from the tube 12 into the fan casing 21. In the construction shown, a suction fan 24 is provided at the opposite end of the receptacle 10 in position to draw the dust laden air out of the pipe 17, and after the dust laden air passes thru the fan casing it is discharged thru the outlet conduit 25 leading from this fan. It is contemplated that the volume of the dust freed air which is removed by the pipe 12 will be much greater than the volume of the remaining air that is laden with dust and which is removed by the pipe 17, and the pipe 12 for receiving the dust freed air is therefore shown as much larger in diameter than the pipe 17 for receiving the dust laden air. Likewise the fan 21 is shown much larger than the fan 24. The central driving shaft 26 of the fan 24 is shown as journaled upon the supporting frame 27, the base of which may be secured to the floor or platform 28. The shaft 26 is shown as provided with a driving pulley 29 but obviously may be driven by an electric motor, or otherwise as desired. The large fan 21 may be provided with a similar supporting frame 30.

As a result of the construction shown the two fans just mentioned will produce a sufficient suction force to draw the dust laden air thru the inlet conduit 11 into the receptacle 10 at a high velocity, so that the centrifugal force will throw the particles of dust outwardly, as shown. In some cases, however, it may be desirable to employ not only the two fans shown, but also a blast fan or the like (not shown), which may be connected to the inlet conduit 11 for forcing the dust laden air into the receptacle 10. In still other cases it may be desirable to omit the suction fans 21 and 24 and to simply employ a blast fan connected to the inlet conduit 11 to force the dust laden air into the receptacle 10 so that the pressure of the air within the receptacle will cause the dustladen air to escape thru the pipe 17 while the dust free air will escape thru the pipe 12.

In the modification shown in Fig. 3 the construction is such that a dust receiving hopper or settling chamber is provided below the receptacle 10 in which the heavier dust may settle to be discharged from time to time. In this modified construction the pipe 12 for receiving the dust freed air has a slightly different inlet opening 15 from that shown in Figs. 1 and 2, and also has a differently shaped lip 16 for directing the air in thru this opening. It will be noted that the dust laden air as it leaves the circular portion of the receptacle 10 passes downwardly into the chamber 31 formed below the receptacle 10 by the downwardly inclined wall 32 and by the curved wall 33. The dust receiving pipe 17 in this construction is disposed at one side of the passage thru which the dust laden air passes into the chamber 31 so that the dust will have a chance to settle in this chamber before the dust laden air enters the pipe 17. The lower portion of the dust receiving hopper is provided with a swinging door 34 which is normally closed, but which will open to permit the discharge of dust.

In the modified construction shown in Fig. 4, the receptacle 10 is substantially circular in cross section, instead of having the involute curve of Figs. 1 and 2, and the discharge pipe 12 is given a somewhat spiral construction so that a curved portion 35 of this pipe forms an underneath portion of the receptacle 10, and it will be noted that a portion 36 of the circular wall of the casing 10 extends into the pipe 17 to direct the dust ladden air into this pipe.

When two suction fans are provided as shown in Fig. 1, one of which is connected to the pipe 12 for receiving the dust freed air, and the other to the pipe 17 for receiving the dust laden air, these two fans may be operated at such speed that they will produce approximately an equal suction force within their respective pipes, or, if desired, their speed may be varied so that the suction of one pipe may be greater than the suction in the other.

It should be noted that in the construction shown in Fig. 1 the dust freed air in the inner tube 12 is caused to travel lengthwise of its pipe in one direction and that the dust laden air in the pipe 17 travels lengthwise of its pipe in the opposite direction. This arrangement by which the air travels in one direction in one pipe and in the opposite direction in the other pipe is desirable as it tends to assist the air separation within the casing. It should also be noted that a dividing partition is provided at the inner end of the spiral air passage which serves to direct part of the air into the air pipe 12 and the rest of the air into the dust pipe 17. This dividing effect of the air is produced in Fig. 2 by the lip 16 and wall 20, and in Figs. 3 and 4 by a slightly different construction.

What is claimed is:

1. A device for reducing the volume of dust laden air, comprising in combination, an approximately cylindrical shaped receptacle, a conduit for directing dust laden air into the receptacle so that it whirls therein with a centrifugal force that throws the dust outwardly toward the wall of the receptacle, an outlet pipe mounted approximately centrally within the receptacle to extend longitudinally thereof and having an inlet opening to receive the dust freed air that moves inwardly toward the centre of the receptacle, a second outlet pipe extending lengthwise of the receptacle and having an inlet opening positioned to receive the dust laden air traveling adjacent said wall, and suction means for exhausting air from said pipes so that the dust freed air travels lengthwise of its pipe in one direction and the dust laden air travels lengthwise of its pipe in the opposite direction.

2. A device for reducing the volume of dust laden air, comprising in combination, a casing having curved side walls, a conduit for directing dust laden air into the casing so that it whirls therein with a centrifugal force that throws the dust outwardly toward the side walls of the casing, a pipe disposed near the centre of the casing to extend lengthwise thereof and having an inlet opening to receive the dust freed air that moves inwardly toward the centre of the casing, a second pipe extending lengthwise of the casing and having an inlet opening positioned to receive the dust laden air traveling adjacent said walls, suction means at one end of the casing to draw the dust freed air lengthwise of its pipe in one direction, and suction means at the opposite end of the casing to draw the dust laden air lengthwise of its pipe in the opposite direction.

3. A device for reducing the volume of dust laden air, comprising in combination, a casing having an inlet pipe mounted therein so that it forms an approximately spiral inlet passage between the pipe and inner wall of the casing, a conduit for directing dust laden air into said passage so that the heavier particles are thrown outwardly by centrifugal force against the wall of the casing as the air travels around the curved passage, a second pipe extending lengthwise of the casing to receive the dust laden air, and a wall extending lengthwise of the casing at the inner end of said passage and constructed to direct the dust freed air into said inlet pipe and the dust laden air whirling adjacent the wall of the casing into the dust receiving pipe.

4. A device for reducing the volume of dust laden air, comprising in combination, a casing having a pipe mounted therein to extend lengthwise of the casing and arranged to form an approximately spiral inlet passage between the pipe and inner wall of the casing, means for directing dust laden air into the passage so that the dust is thrown outwardly by centrifugal force against the wall of the casing as it travels around the curved passage, a second pipe extending lengthwise of the casing to receive the dust laden air, and a wall disposed at the inner end of said spiral passage to form a dividing partition that directs the dust freed air into the first mentioned pipe and the dust laden air traveling near the inner wall of the casing into the second mentioned pipe.

5. A device for reducing the volume of dust laden air, comprising in combination, a casing having a curved wall mounted therein to form an air outlet pipe extending lengthwise of the casing and arranged to form an approximately spiral inlet passage between the pipe and wall of the casing and which decreases in size in the direction in which air travels within the passage, means for directing dust laden air into the passage so that the dust is thrown outwardly by centrifugal force against the wall of the casing as it travels around the curved passage, a second pipe adjacent said casing, and a wall at the inner end of the spiral passage for diverting the path of travel of the air to cause the dust freed air to enter the first mentioned pipe and the dust laden air traveling adjacent the wall of the casing to enter said second pipe.

6. A device for reducing the volume of dust laden air, comprising in combination, an approximately cylindrical shaped receptacle, an outlet pipe mounted approximately centrally within the receptacle to extend longitudinally thereof and having an inlet opening to receive the dust freed air, a second outlet pipe extending lengthwise of the receptacle and having an inlet opening positioned to receive the dust laden air traveling adjacent the inner wall of the receptacle, a curved conduit formed within the receptacle about the first mentioned pipe and constructed to direct dust laden air into the receptacle with a whirling movement that throws the dust outwardly against the wall of the receptacle by centrifugal force, and a wall at the inner end of the curved conduit and constructed to form diverging passages one of which leads to the opening in the first mentioned pipe and the other to the opening in the second mentioned pipe.

In testimony whereof, I have signed my name to this specification.

ALBERT H. STEBBINS.